United States Patent
Leyre

(10) Patent No.: US 8,251,315 B2
(45) Date of Patent: Aug. 28, 2012

(54) FORMATION FLIGHT DEVICE INTENDED FOR A SOLAR CORONAGRAPHY MISSION

(75) Inventor: Xavier Leyre, Opio (FR)

(73) Assignee: Thales (FR)

( * ) Notice: Subject to any disclaimer, the term of this patent is extended or adjusted under 35 U.S.C. 154(b) by 870 days.

(21) Appl. No.: 12/239,917

(22) Filed: Sep. 29, 2008

(65) Prior Publication Data

US 2009/0101758 A1 Apr. 23, 2009

(30) Foreign Application Priority Data

Oct. 23, 2007 (FR) .................................. 07 07421

(51) Int. Cl.
*B64G 1/66* (2006.01)
(52) U.S. Cl. .................................. 244/158.4; 244/172.7
(58) Field of Classification Search ............... 244/158.4, 244/172.7, 172.8; 356/621
See application file for complete search history.

(56) References Cited

U.S. PATENT DOCUMENTS

| 5,386,953 | A | * | 2/1995 | Stuart | 244/158.4 |
| 7,784,740 | B2 | * | 8/2010 | Massonnet | 244/171.1 |

FOREIGN PATENT DOCUMENTS

FR 2867283 A1 9/2005

OTHER PUBLICATIONS

S. Vives et al: "Formation Flyers Applied to Solar Coronal Observations: The ASPICS Mission"; Solar Physics and Space Weather Instrumentation, vol. 5901, No. 590116-1, 2005, XP002480140.
X. Leyre et al: "Concept of Formation Flyer for the ASPICS Solar Coronagraphic Mission"; UV/Optical/IR Space Telescopes: Innovative Technologies and Concept II, vol. 5899, No. 58990N-1, 2005, XP002480141.

* cited by examiner

*Primary Examiner* — Benjamin P Lee
(74) *Attorney, Agent, or Firm* — Lowe Hauptman Ham & Berner, LLP

(57) ABSTRACT

The present invention relates to a device making it possible to study the solar corona on a space mission requiring the formation flight of two satellites: an occulting satellite (OCC), the role of which is to create an artificial eclipse of the sun from the point of view of a coronagraph (10) onboard a second satellite, called carrying satellite (COR). The invention presents the advantage of proposing a formation flight device intended for a solar coronagraphy mission comprising fixed solar panels (11a), requiring no deployment, thanks to a dissymmetrical accommodation of the coronagraph (10) reflected in a shifting of said coronagraph (10) to a side of the carrying satellite (COR).

8 Claims, 5 Drawing Sheets

FORMATION FLIGHT DEVICE INTENDED FOR A SOLAR CORONAGRAPHY MISSION

RELATED APPLICATIONS

Figure 1:
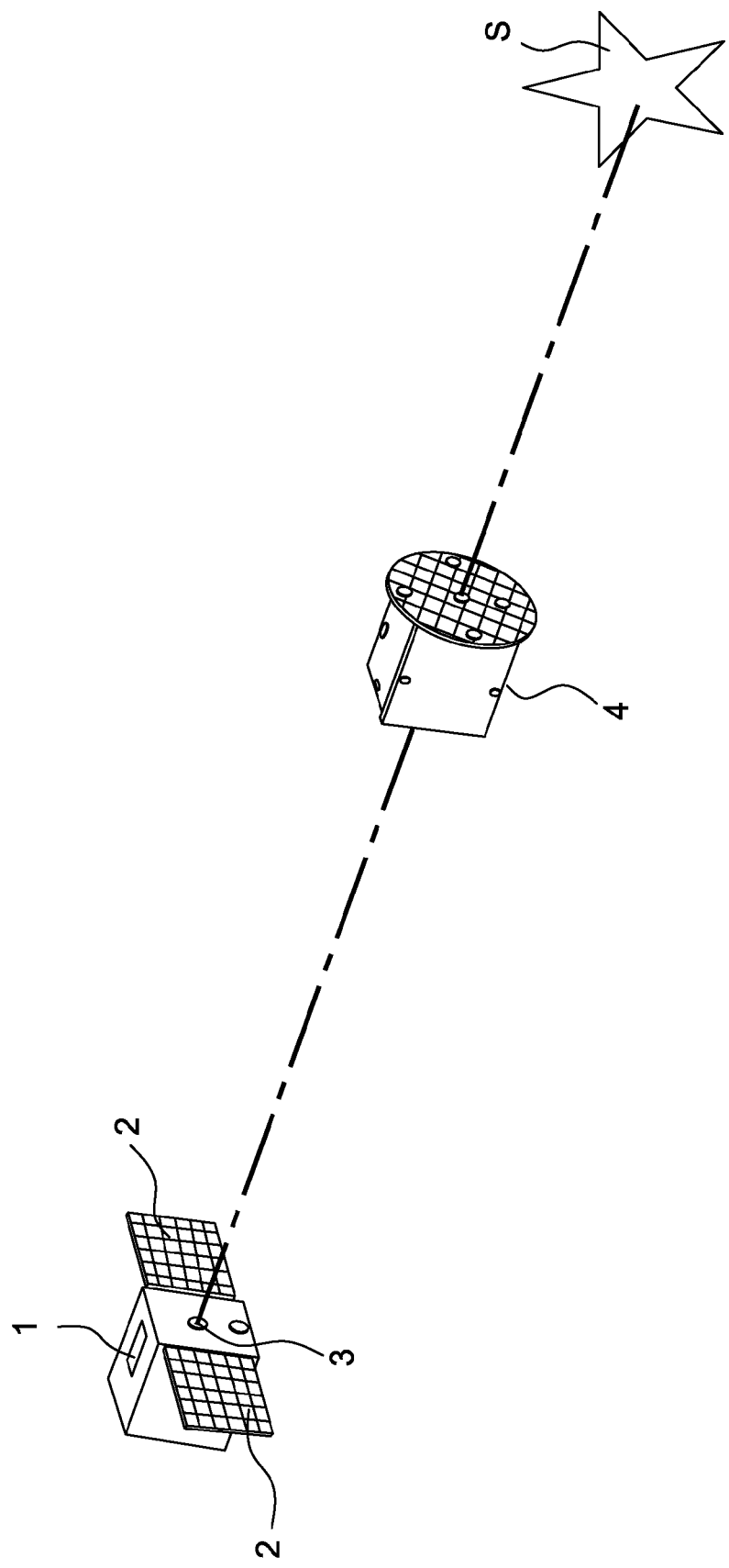

The present application is based on, and claims priority from, French Application Number 07 07421, filed Oct. 23, 2007, the disclosure of which is hereby incorporated by reference herein in its entirety.

FIELD OF THE INVENTION

The present invention relates to a device making it possible to study the solar corona. Studying the solar corona entails performing coronagraphies, a technique that involves reproducing an artificial total eclipse of the sun in order to eliminate the light emitted by the solar disk. The benefit of this technique, besides the fact that it makes it possible to observe the solar corona, lies also in the fact that it makes objects orbiting close to it more easily visible.

BACKGROUND OF THE INVENTION

This type of study is notably made possible by space missions that can entail the formation flight of two satellites: an occulting satellite, the role of which is to create an artificial eclipse of the sun from the point of view of a coronagraph onboard a second satellite, that will be called carrying satellite. Thanks to the shadow cast by the occulting satellite on the carrying satellite, the coronagraph can observe the solar corona. By definition, the sun, the occulting satellite and the coronagraph are aligned in that order.

In order to produce the electricity needed for the coronagraphy mission, the carrying satellite and the occulting satellite comprise one or more solar panels associated with solar generators.

Currently, the difficulty lies in the fact that it is necessary for both the coronagraph to be located in the solar shadow, a shadow cast by the occulting satellite on the carrying satellite, and for the solar panels of the carrying satellite to be sufficiently illuminated by the sun to be able to supply the satellite with the necessary energy.

The solutions currently developed to overcome this problem involve deploying solar panels either side of the carrying satellite using mechanical arms. The deployment of these solar panels makes it possible to place the latter outside the range of the solar shadow generated by the occulting satellite.

This type of solution presents the major drawbacks of being complex to implement and very costly. Furthermore, the additional structures formed by the long mechanical arms needed to deploy the solar panels generate a significant extra weight, and require stacking and unstacking mechanisms in order to accommodate the device under the nose cone of the launch vehicle, these mechanisms further increasing the complexity and the cost.

Above all, all these complex mechanisms present a high risk of failures, failures that can lead to a total or partial loss of the mission.

Thus, one aim of the invention is notably to overcome the drawbacks discussed above. In practice, rather than deploying the solar panels outside the cone of shadow cast by the occulting satellite on the carrying satellite, the present invention proposes in a certain way to shift the shadow toward an off-centered zone of the carrying satellite where the coronagraph will be positioned. In this way, the coronagraph is shifted to a side of the carrying satellite and the shadow cast by the occulting satellite, which is arranged so that it is approximately centered on the coronagraph, does not consequently entirely cover the face oriented toward the sun of the carrying satellite.

A set of solar panels can thus be fixed on the carrying satellite, preferably extending in the direction opposite to the side to which the coronagraph has been shifted.

SUMMARY OF THE INVENTION

To this end, the subject of the invention is a formation flight device intended for a solar coronagraphy mission, comprising:

a carrying satellite having a center which, with the center of the sun, defines an axis of the carrying satellite, the carrying satellite comprising a coronagraph oriented toward the sun and at least one solar panel located on a face of the carrying satellite oriented toward the sun, an occulting satellite, located between the sun and the carrying satellite, generating a shadow cast on the carrying satellite, the sun, the occulting satellite and the coronagraph being aligned in that order and defining a line of sight of the coronagraph, and the shadow cast by the occulting satellite on the carrying satellite masking all the central part of the sun, called solar disk, for the coronagraph, enabling the coronagraph to image the solar corona, wherein the coronagraph is off-centered, shifted to a side of the carrying satellite, the line of sight of the coronagraph being distinct from the axis of the carrying satellite, and the maintaining of the occulting satellite on the line of sight of the coronagraph resulting in a shifting of the shadow cast by the occulting satellite to the side of the carrying satellite where the coronagraph is located, so that the shadow cast by the occulting satellite on the carrying satellite does not entirely cover the face oriented toward the sun of the carrying satellite and, consequently, the solar panel is placed in such a way that it is not entirely covered by the cast shadow.

Advantageously, the solar panel is off-centered, shifted opposite the coronagraph on the carrying satellite.

Advantageously, the solar panel is fixed on the carrying satellite.

Advantageously, a fixed radiator located close to the coronagraph, in the direction opposite to the sun, makes it possible to regulate the temperature on the coronagraph.

Advantageously, the carrying satellite comprises at least one solar generator associated with the solar panel and making it possible to produce the necessary energy for the device.

Advantageously, the coronagraph is off-centered, shifted to a corner of the carrying satellite, so enabling the sun to illuminate a maximum area of the face oriented toward the sun of the carrying satellite, and consequently of the solar panel that it contains.

Advantageously, the carrying satellite also comprises thrusters, that can be ejectors of cold gas, making it possible to control the relative position of the carrying satellite and of the coronagraph relative to the occulting satellite and relative to the sun.

Advantageously, the occulting satellite also comprises thrusters, that can be ejectors of cold gas, making it possible to control the relative position of the occulting satellite relative to the carrying satellite and to the coronagraph and relative to the sun.

Advantageously, the carrying satellite also comprises an optical metrology device making it possible to know and control the relative position of the carrying satellite and of the coronagraph relative to the occulting satellite.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description, thereof are to be regarded as illustrative in nature, and not as restrictive.

BRIEF DESCRIPTION OF THE INVENTION

Figure 2:
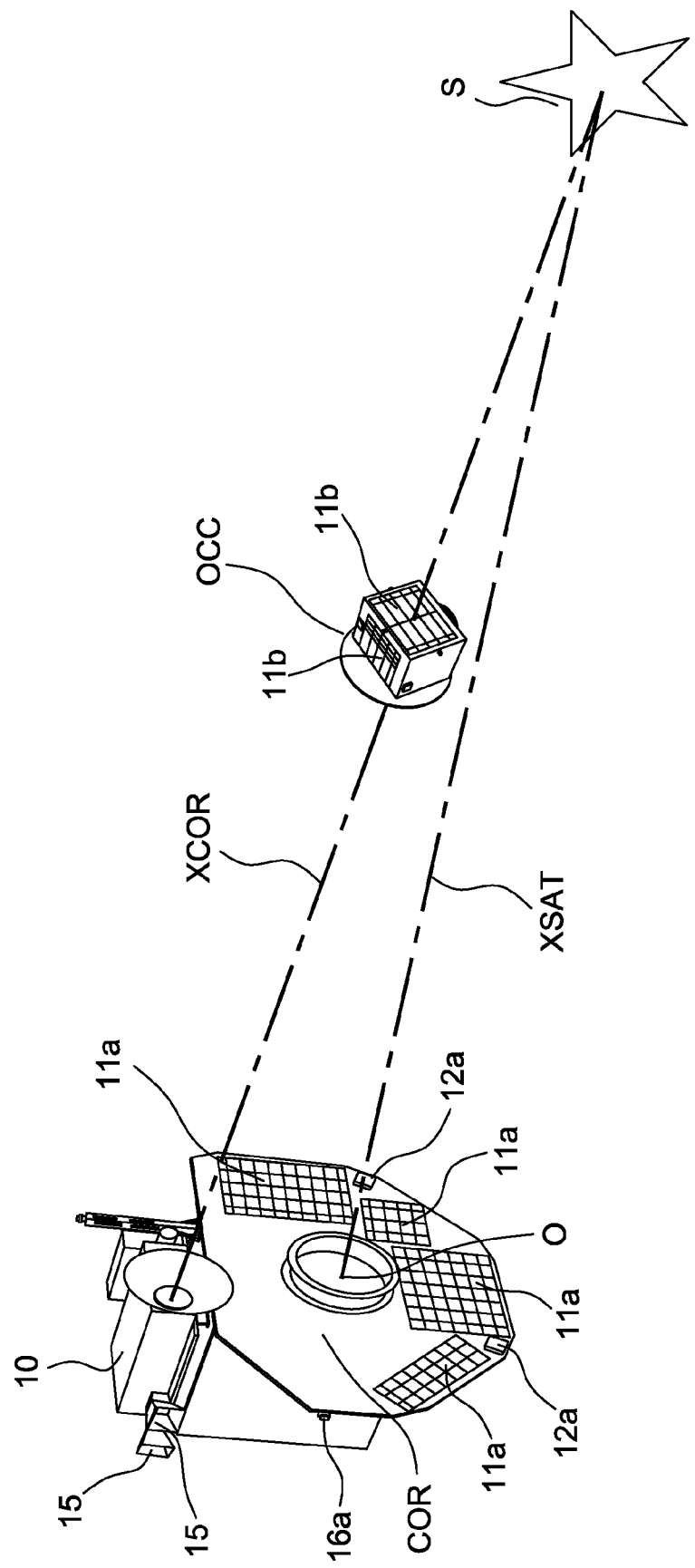
Figure 3:
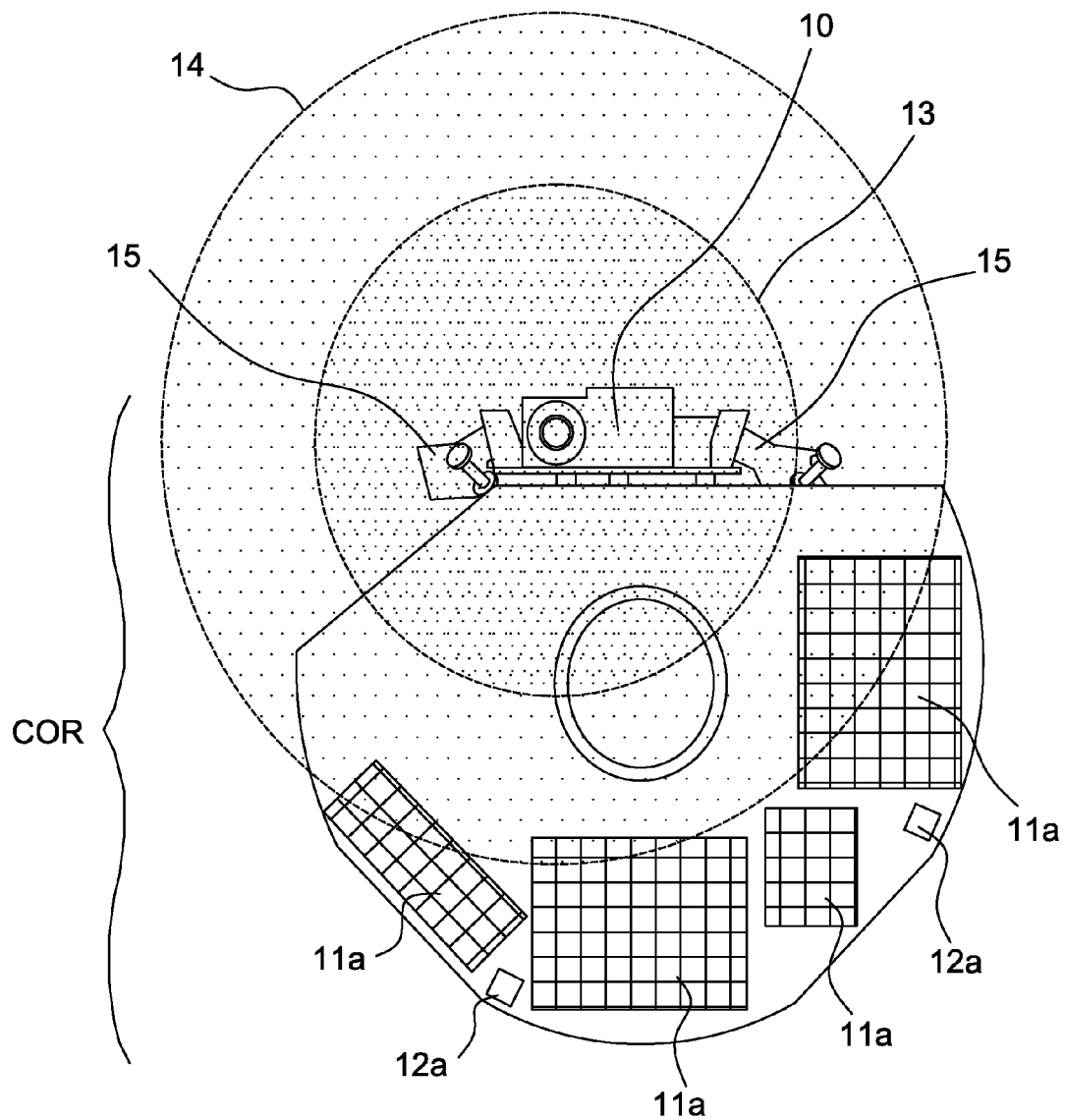
Figure 4:
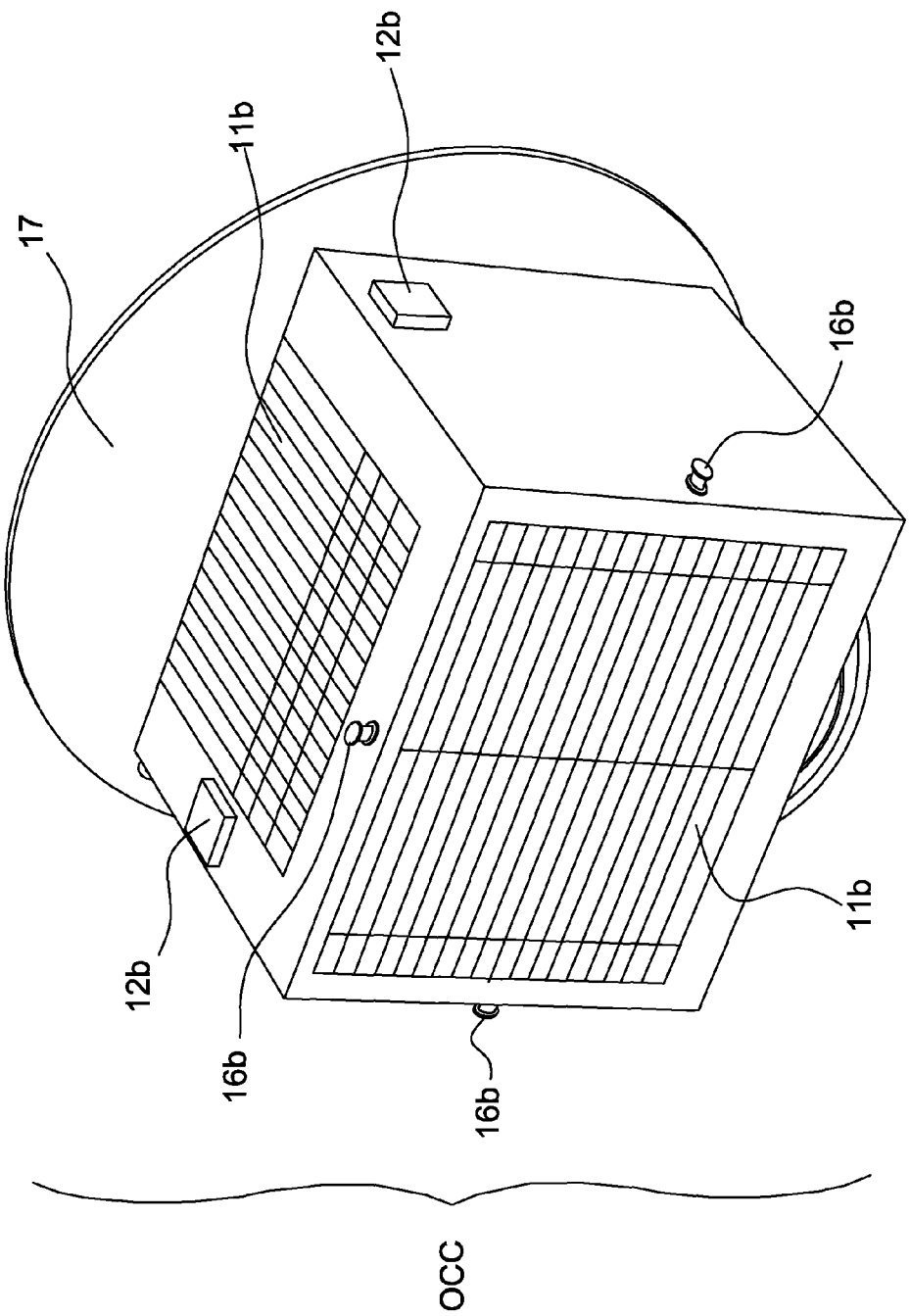
Figure 5:
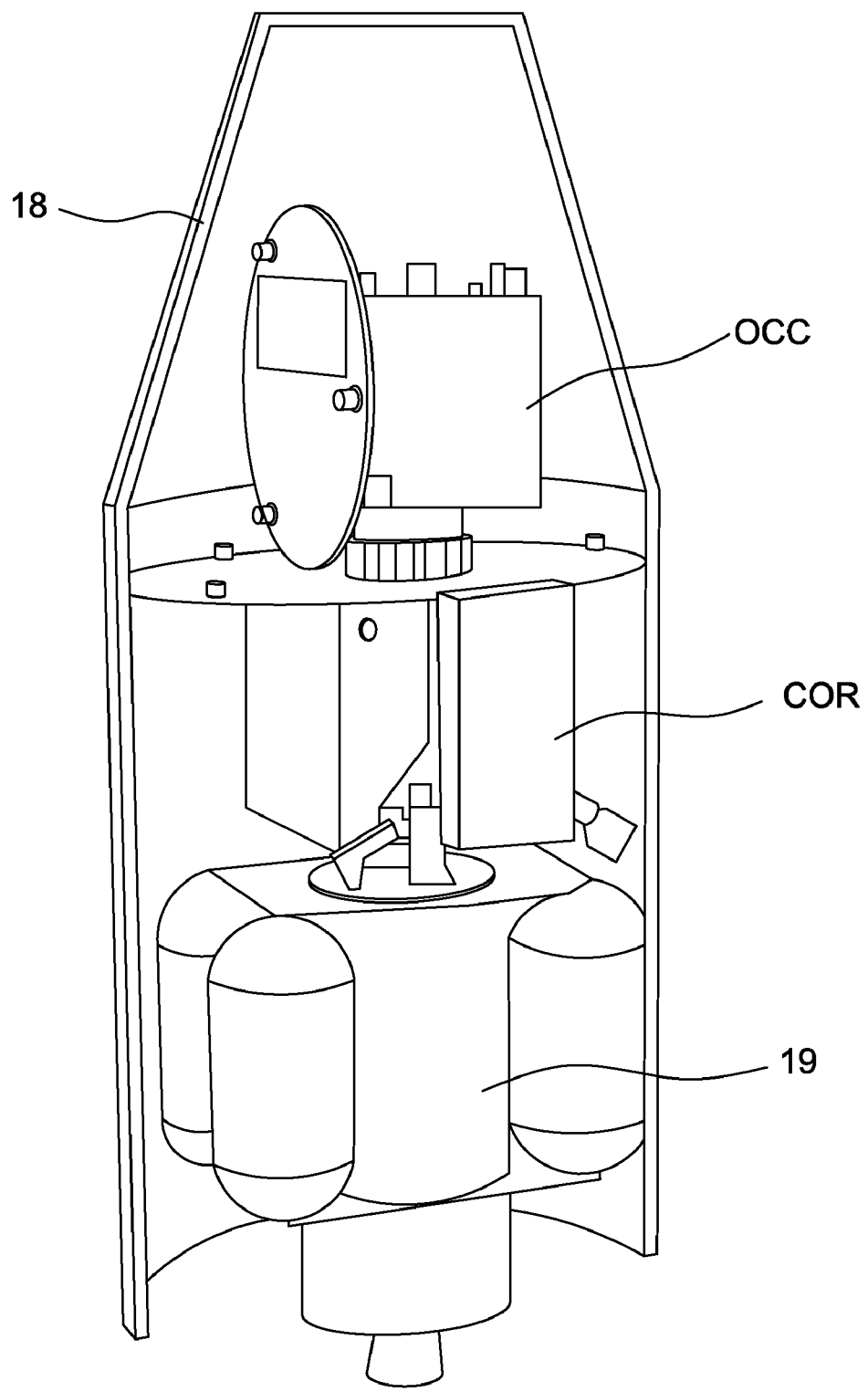

The present invention is illustrated by way of example, and not by limitation, in the figures of the accompanying drawings, wherein elements having the same reference numeral designations represent like elements throughout and wherein:

FIG. 1: the diagram of an exemplary formation flight device comprising a solar coronagraph in the state of the art;

FIG. 2: the diagram of an exemplary formation flight device comprising a solar coronagraph according to the invention;

FIG. 3: the illustration of an exemplary carrying satellite in one possible configuration of the device according to the invention;

FIG. 4: the illustration of an exemplary occulting satellite in one possible configuration of the device according to the invention;

FIG. 5: the diagrammatic representation of an exemplary device according to the invention in any nose cone of a launch vehicle.

DETAILED DESCRIPTION OF THE INVENTION

FIG. 1 is a diagram illustrating the formation flight devices including a coronagraph as currently developed. Thus, to study the corona of the sun S, an occulting satellite 4 is positioned between a carrying satellite 1 comprising a coronagraph 3 and the sun S.

In this way, the occulting satellite 4 masks the central part of the sun from the point of view of the coronagraph 3 which can therefore image the solar corona. In order to produce the energy needed for the mission, the carrying satellite 1 has solar panels 2. In order for the latter to be sufficiently illuminated by the sun S, and therefore outside the cone of shadow created by the occulting satellite 4, the solar panels 2 are deployed either side of the carrying satellite 1. This deployment is necessarily performed after the carrying satellite 1 has been positioned at its observation point; in practice, the deployed panels 2 present a bulk that is far too great for the nose cone of the current launch vehicles. Thus, complex deployment mechanisms, not represented in the diagram, comprising long mechanical arms and stacking and unstacking mechanisms for the accommodation under the nose cone of the launch vehicle, are made essential. They increase the design complexity, the weight, the cost, and also the risk of failure. Such a failure of a mechanism useful for the deployment of the solar panels 2 can result in the total or partial loss of the mission.

The present invention makes it possible notably to overcome this problem.

FIG. 2 illustrates the principle of the invention. The central idea of the present patent is in fact to shift the coronagraph 10 to the periphery of the carrying satellite COR. In practice, the occulting satellite OCC is necessarily positioned on the line of sight XCOR of the coronagraph 10, since, to be able to correctly image the solar corona, the coronagraph needs to be located in the shadow cast by the occulting satellite OCC; the aim here is to retain the alignment between the sun, the occulting satellite OCC and the coronagraph 10. The line of sight XCOR of the coronagraph 10 is not therefore coincident with the axis of the carrying satellite XSAT, an axis passing through the center O of the carrying satellite COR and the center of the sun S. This shifting of the coronagraph 10 to the periphery of the carrying satellite COR will consequently result in the corresponding shifting of the cone of shadow created by the occulting satellite OCC toward the periphery of the carrying satellite COR, to where the coronagraph 10 is located. In practice, since the coronagraph 10 is positioned off-center on the carrying satellite COR, the occulting satellite OCC is offset, it is maintained on the line of sight XCOR of the coronagraph 10 and it therefore leaves the axis of the carrying satellite XSAT, so that the coronagraph 10 is indeed located in the shadow cast by the occulting satellite OCC.

The relative positioning of the carrying satellite COR and of the occulting satellite OCC is handled using an optical metrological sensor which is not represented here. Moreover, the solar panels 11a, the solar sensors 12a, the star sensors 15 and the thrusters 16a will be described using FIG. 3 whereas the solar panel 11b will be mentioned in the description of FIG. 4.

Consequently, the face oriented toward the sun of the carrying satellite COR is not entirely covered by the shadow of the occulting satellite OCC; this point will be expanded in the description of FIG. 3.

Moreover, the thermal regulation of the device can be handled by radiators fixed to the coronagraph 10 and to the shell of the carrying satellite COR in the direction opposite to the sun.

FIG. 3 illustrates an exemplary arrangement of the carrying satellite COR comprising the coronagraph 10 in one possible configuration of the device according to the invention.

Thus, the cone of shadow represented by the zones 13, total shadow zone, and 14, degressive penumbra zone, do not entirely cover the surface oriented toward the sun of the carrying satellite COR. Consequently, solar panels 11a can be placed on said face oriented toward the sun of the carrying satellite COR. These solar panels 11a receive sufficient illumination, enabling them to produce the energy needed for the mission. The arrangement of these solar panels 11a in FIG. 2 is just one exemplary arrangement in accordance with the concept of the present patent. According to the same principle, other arrangements of one or more solar panels are of course possible.

Moreover, the solar sensors 12a make it possible to check the illumination by the sun of the carrying satellite COR. As for the star sensors 15, they are mainly used for the absolute and relative positioning relative to the occulting satellite OCC of the carrying satellite COR. Finally, small thrusters (16a in FIG. 2), for example ejectors of cold gas, are positioned in different locations of the carrying satellite COR in order to enable displacements of the latter.

FIG. 4 represents an exemplary occulting satellite OCC. The circular or quasi-circular zone 17 is that which will principally create the cone of shadow intended to mask the solar disk, that is, all the central part of the sun, from the point of view of the coronagraph 10, enabling it to observe the solar corona. For its operation, the occulting satellite OCC needs solar panels 11b, fixed to the faces oriented toward the sun, and which will supply the necessary energy.

Also, the solar sensors 12b make it possible to check the illumination of the zones oriented toward the sun of the occulting satellite OCC whereas the thrusters 16b, which can be ejectors of cold gas, make it possible to reposition the occulting satellite OCC.

FIG. 5 illustrates the possibility of incorporating the device described in the present patent inside a nose cone of a standard launch vehicle. Unlike the current devices, for which the solar panels of the carrying satellite are shifted either side of said satellite, and therefore deployed once the satellite is placed in position in space, because of the lack of space in the nose cone of the launch vehicle, it can be seen here that the two satellites COR and OCC can be incorporated without difficulty in the nose cone 18 of a current launch vehicle, of which the engine of the last stage 19 is represented in a simple diagrammatic way.

One of the main benefits of the invention is the fact that it makes it possible not to have complex mechanisms to deploy the solar panels. The risks of breakage and failure are thus minimized, whereas the design and incorporation are greatly facilitated.

To sum up, the invention therefore presents the advantage of proposing a formation flight device intended for a solar coronagraphy mission comprising fixed solar panels, requiring no deployment, thanks to a dissymmetrical accommodation of the coronagraph reflected in a shifting of said coronagraph to a side of the carrying satellite.

This shifting of the coronagraph means, because of the alignment in this order of the sun, the occulting satellite and the coronagraph, a shifting of the shadow cast by the occulting satellite on the carrying satellite, enabling a major portion of the surface oriented toward the sun of the carrying satellite to be sufficiently illuminated for the solar panels fixed to this surface to be able to supply the carrying satellite, and the coronagraph in particular, with the energy needed for the mission.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A formation flight device for a solar coronagraphy mission, comprising:
a carrying satellite having a center which, with the center of the sun, defines an axis of the carrying satellite, said carrying satellite comprising a coronagraph oriented toward the sun and at least one solar panel located on a face of said carrying satellite oriented toward the sun,
an occulting satellite, located between the sun and the carrying satellite, generating a shadow cast on the carrying satellite, the sun, the occulting satellite and the coronagraph being aligned in that order and defining a line of sight of the coronagraph, and the shadow cast by the occulting satellite on the carrying satellite masking all the central part of the sun for the coronagraph, enabling said coronagraph to image the solar corona,
wherein said coronagraph is off-centered, shifted to a side of the carrying satellite, the line of sight of the coronagraph being distinct from the axis of the carrying satellite, and the occulting satellite on said line of sight of the coronagraph resulting in a shifting of the shadow cast by the occulting satellite to the side of the carrying satellite where the coronagraph is located, wherein the shadow cast by the occulting satellite on the carrying satellite does not entirely cover the face oriented toward the sun of said carrying satellite and, the solar panel is not entirely covered by said cast shadow,
wherein said face oriented toward the sun of said carrying satellite is a front face centered on the axis of said carrying satellite, and
said solar panel is off-centered on said front face, shifted opposite the coronagraph on said carrying satellite.

2. The device as claimed in claim 1, wherein said solar panel is fixed on the carrying satellite.

3. The device as claimed in claim 1, wherein a fixed radiator located close to said coronagraph, in the direction opposite to the sun, configured to regulate the temperature on the coronagraph.

4. The device as claimed in claim 1, wherein said carrying satellite comprises at least one solar generator associated with the solar panel and configured to produce the necessary energy for said device.

5. The device as claimed in claim 1, wherein said coronagraph is off-centered, shifted to a corner of the carrying satellite, so the sun illuminates a maximum area of the face oriented toward the sun of the carrying satellite, and the solar panel.

6. The device as claimed in claim 1, wherein said carrying satellite further comprises thrusters configured to control the relative position of the carrying satellite and of the coronagraph relative to the occulting satellite and relative to the sun.

7. The device as claimed in claim 1, wherein said occulting satellite further comprises thrusters configured to control the relative position of the occulting satellite relative to the carrying satellite and to the coronagraph and relative to the sun.

8. The device as claimed in claim 1, wherein said carrying satellite further comprises an optical metrology device configured to detect and control the relative position of the carrying satellite and of the coronagraph relative to the occulting satellite.

* * * * *